(No Model.)
8 Sheets—Sheet 1.

W. H. BAIRSTOW.
DOUBLE PILE FABRIC LOOM.

No. 395,472. Patented Jan. 1, 1889.

WITNESSES.
Alex. Barkoff
Jno. E. Parker

INVENTOR.
Wm H. Bairstow
by his Attorneys
Howson and Sons (No Model.)　　　W. H. BAIRSTOW.　　8 Sheets—Sheet 1.
DOUBLE PILE FABRIC LOOM.

No. 395,472.　　　　　　Patented Jan. 1, 1889.

Witnesses:
John E. Parker.
William D. Conner.

Inventor:
William H. Bairstow
by his Attorneys,
Howson & Son (No Model.)  W. H. BAIRSTOW.  8 Sheets—Sheet 6.
DOUBLE PILE FABRIC LOOM.

No. 395,472.  Patented Jan. 1, 1889.

WITNESSES.  INVENTOR.

(No Model.) 8 Sheets—Sheet 7.
W. H. BAIRSTOW.
DOUBLE PILE FABRIC LOOM.

No. 395,472. Patented Jan. 1, 1889.

WITNESSES:
Alex Barkoff
Jno. E. Parker

INVENTOR
Wm H. Bairstow
BY his Attorneys
Howson and Sons

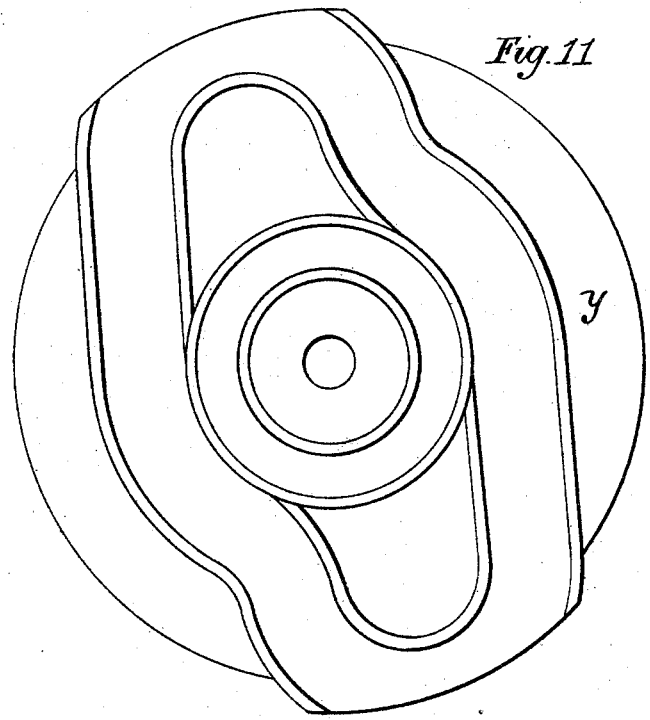
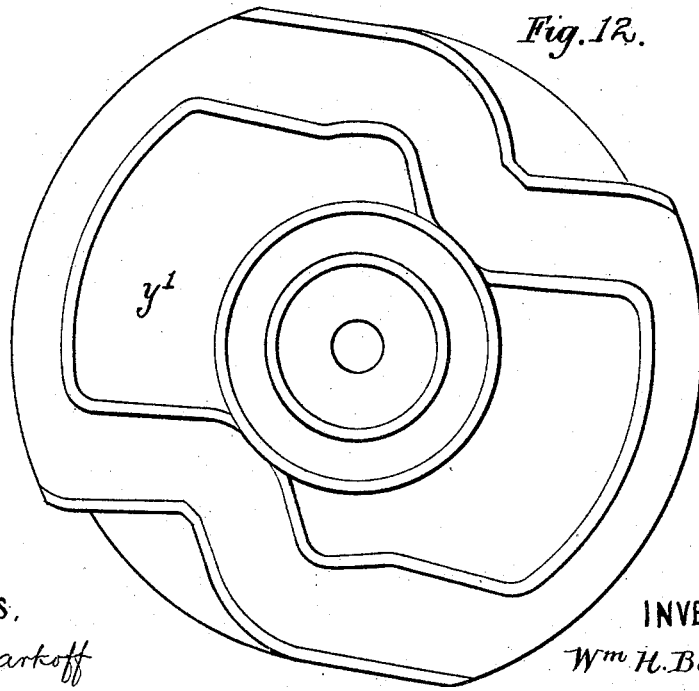

United States Patent Office.

WILLIAM HENRY BAIRSTOW, OF KIDDERMINSTER, COUNTY OF WORCESTER, ENGLAND.

DOUBLE-PILE-FABRIC LOOM.

SPECIFICATION forming part of Letters Patent No. 395,472, dated January 1, 1889.

Application filed December 2, 1886. Serial No. 220,615. (No model.) Patented in England January 14, 1886, No. 619.

*To all whom it may concern:*

Be it known that I, WILLIAM HENRY BAIRSTOW, a subject of the Queen of Great Britain and Ireland, and a resident of Kidderminster, County of Worcester, England, but at present residing at Barmen, Rhenish Prussia, Germany, have invented an Improvement in Double-Pile-Fabric Looms, (for which I have obtained British Patent No. 619, dated January 14, 1886,) of which the following is a specification.

My invention consists of an improvement in the construction of looms for weaving double pile fabrics, wherein a double fabric is produced with the ornamental or body threads between and joining the two fabrics or backings, the two fabrics thus produced being afterward cut or divided by severing the portions of the ornamental or body threads which extend between the two fabrics or backings. By this means two fabrics are produced upon the loom at the same time, each with a cut or velvet pile-face. In the weaving the body-threads are shed both from below and from above—that is, from one of the fabrics or backings to the other—one-half of the ornamental or body threads being normally in one fabric and one-half in the other.

My invention consists in so constructing the loom that the warp-threads will be retained at each operation of the jacquard until they are bound by the shuttle-threads above and below, and so prevent the weights on the bobbins of the warp-threads from drawing the two fabrics together, and thus permitting pile-wires or other equivalents to be dispensed with, as hereinafter more fully described.

Figure 1:
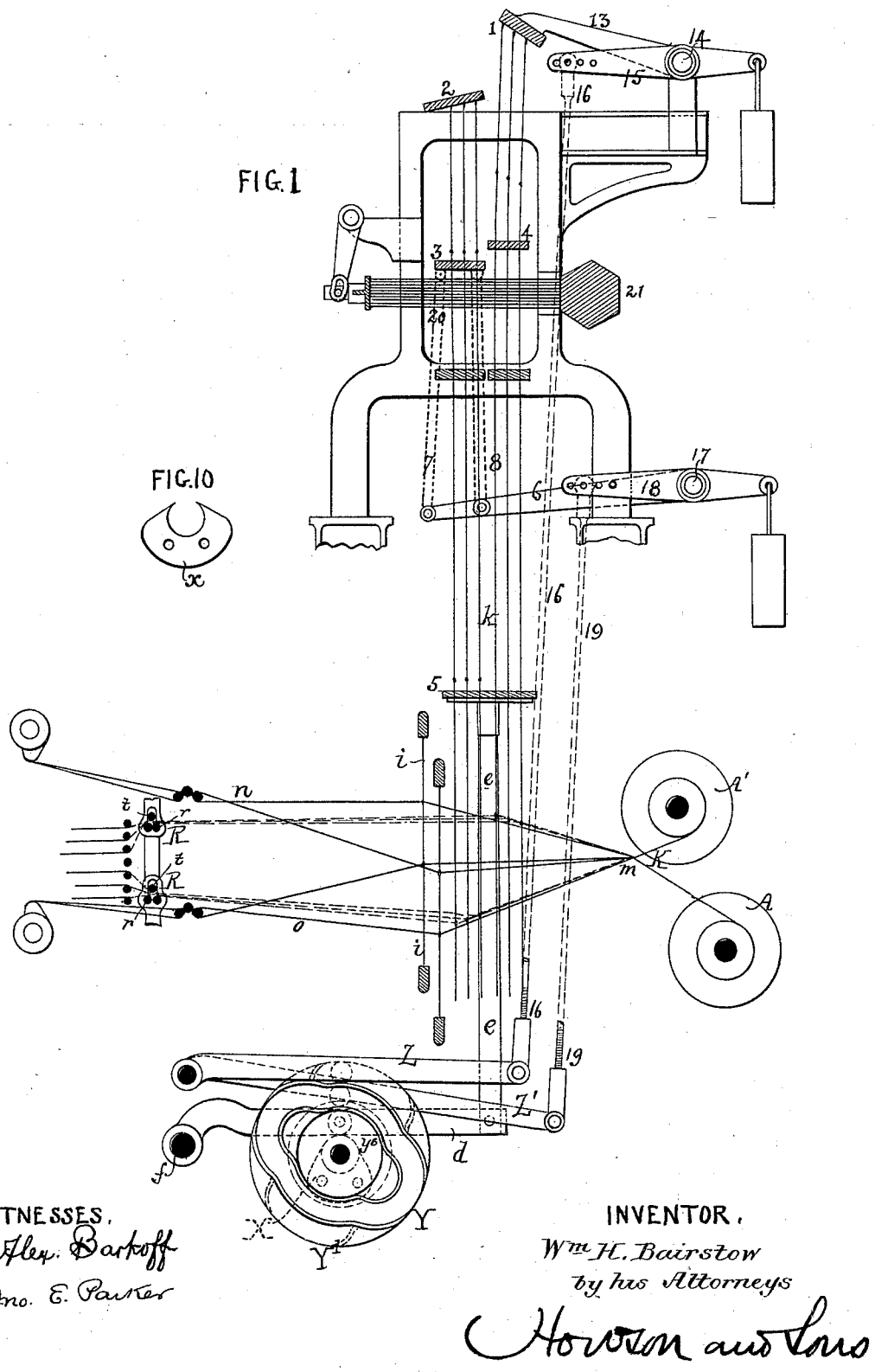
Figure 2:
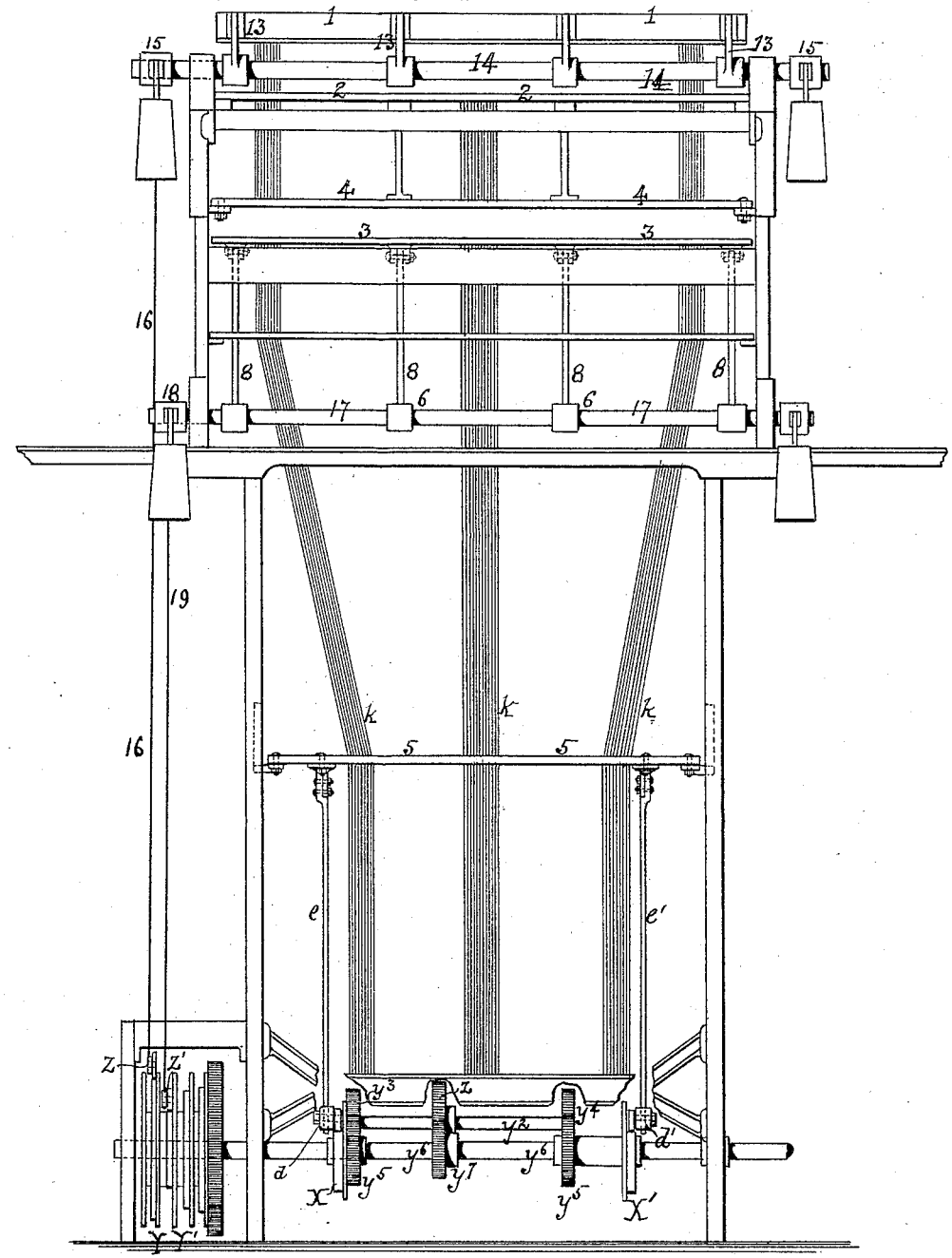
Figure 3:
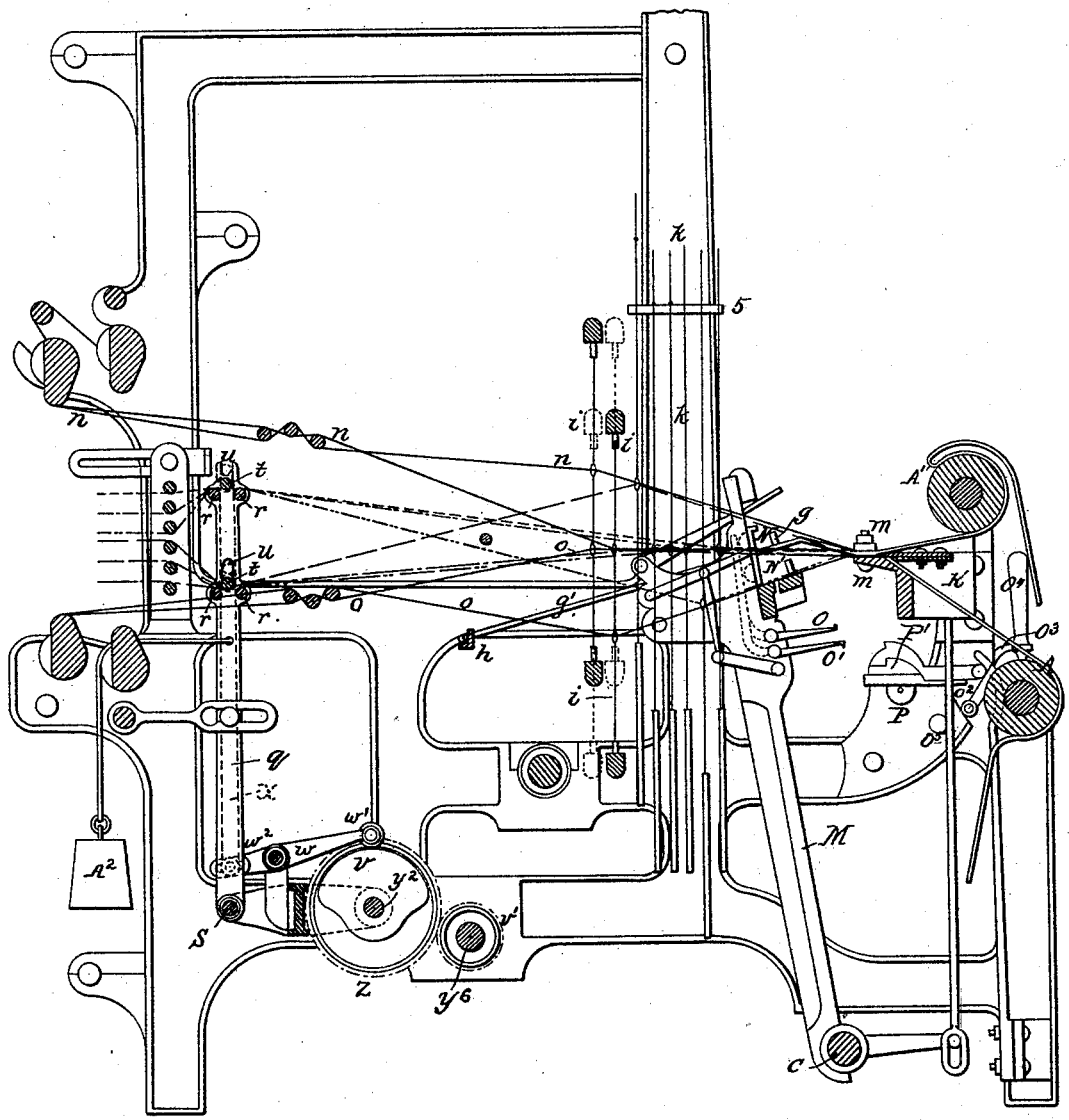
Figure 4:
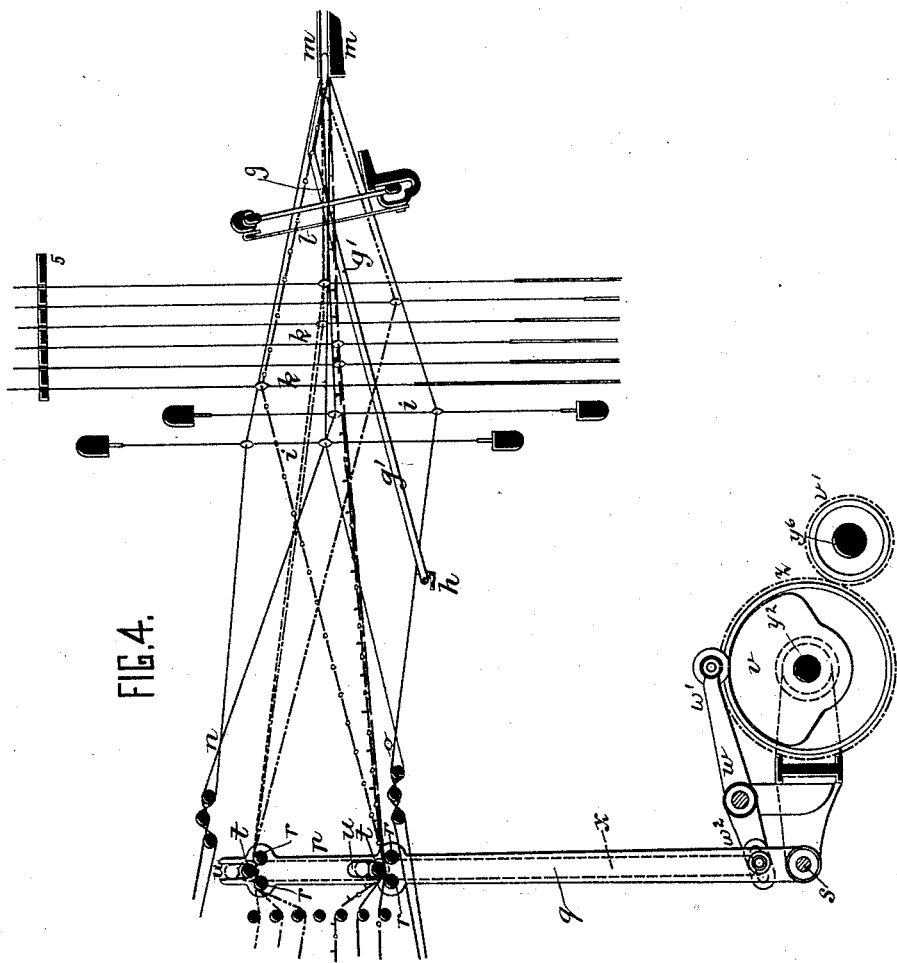
Figure 5:
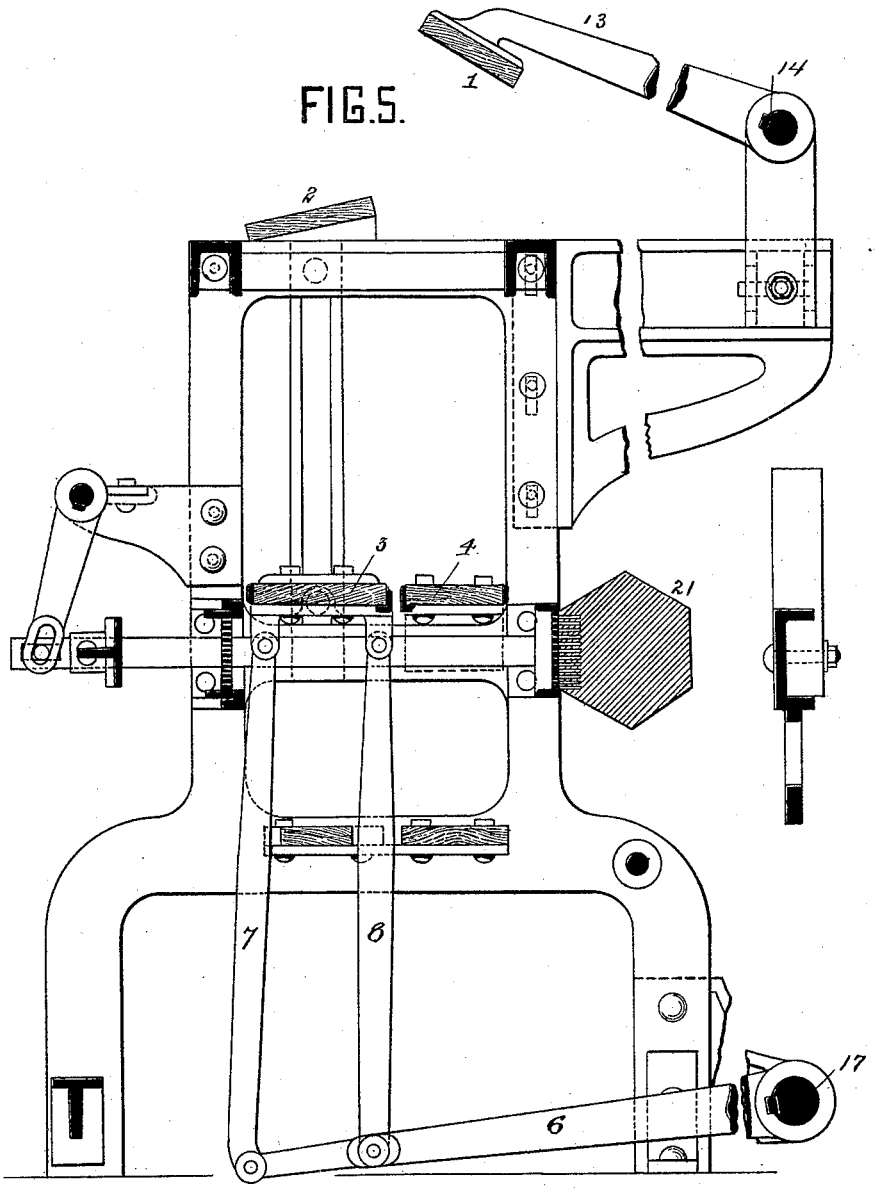
Figure 6:
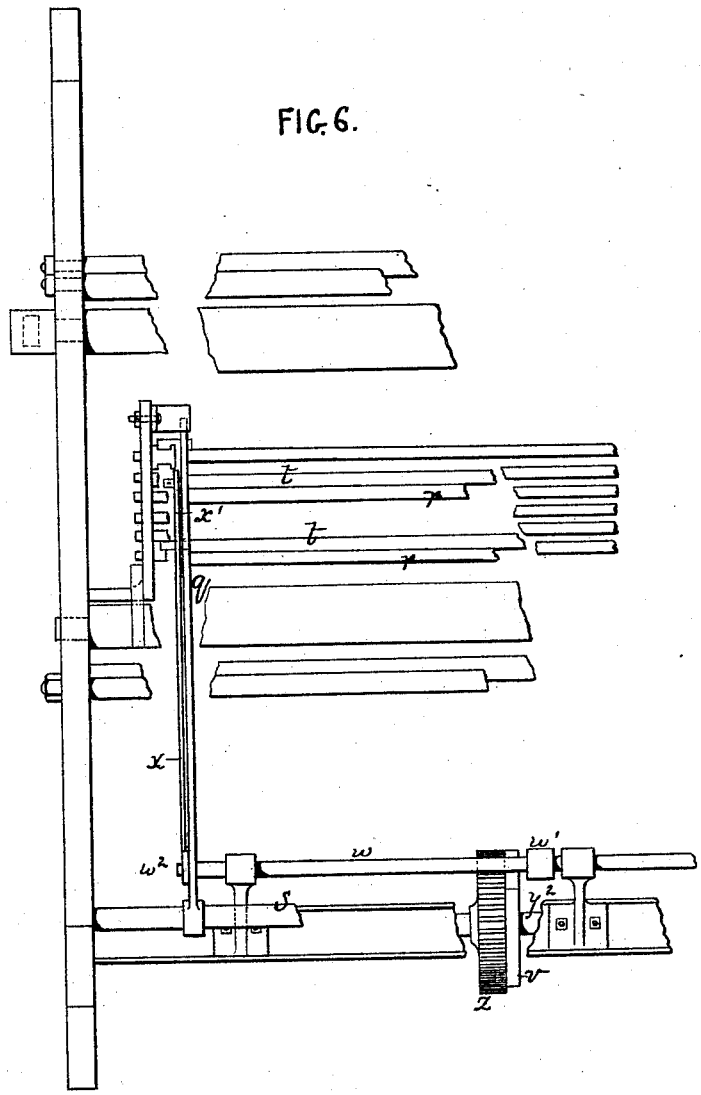
Figure 9:
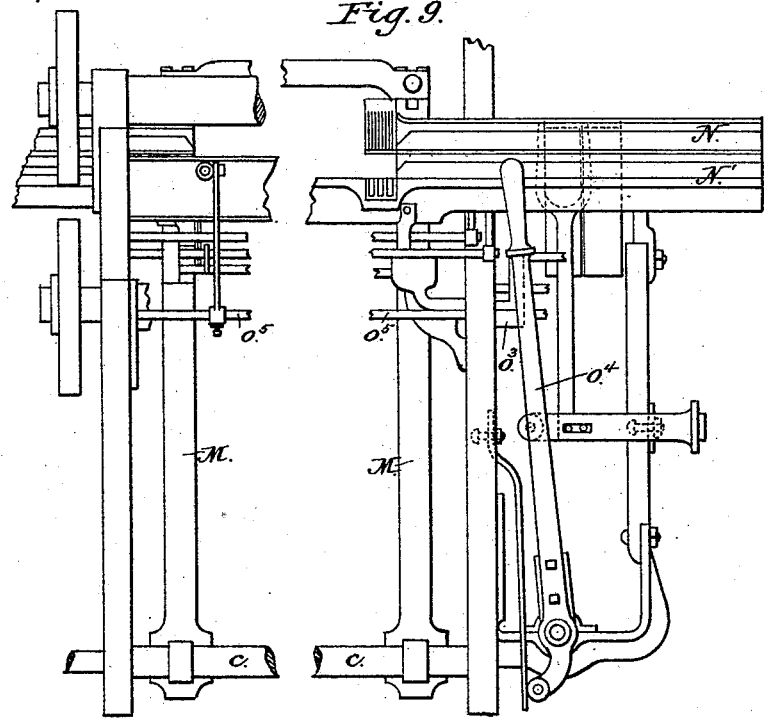
Figure 7:
Figures 13, 14:
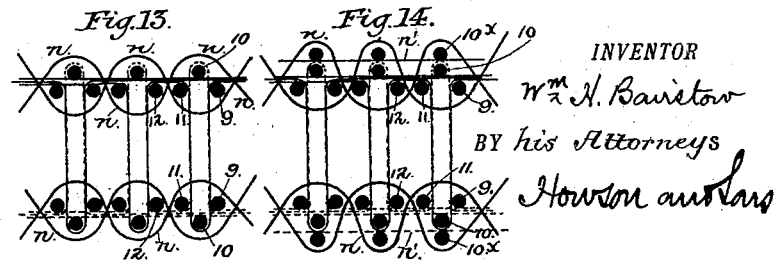

In the accompanying drawings, Figure 1 is a diagrammatic section of part of a loom, showing my improvements. Fig. 2 is a front view of part of a loom with the warps, taking-up rollers, and part of the jacquard omitted. Fig. 3 is a section of the main part of the loom. Fig. 4 is a sectional diagram corresponding in part with Fig. 1, but showing the warp-clamps and their controlling devices. Fig. 5 is a vertical section, drawn to an enlarged scale, of part of the Jacquard mechanism. Fig. 6 is a front view illustrating in part the clamping devices. Fig. 7 is an enlarged sectional view, and Fig. 8 a corresponding plan, of part of the divided middle boards of the jacquard. Fig. 9 is a front elevation of a portion of the loom, illustrating the action of the stop-motion. Figs 10, 11, and 12 are views of cams which may be substituted for those shown in Fig. 1 when a different form of fabric is to be woven. Figs. 13 and 14 are diagrammatic sectional views of two forms of double pile fabric which may be produced by my invention.

A A', Figs. 1 and 3, are the taking-up rollers, upon which the two fabrics are wound as they are formed and after being severed by any suitable cutting mechanism at K. The taking-up rollers and the cutting devices may be operated by any suitable or well-known means, which I have not thought necessary to illustrate, as they form no part of my present invention.

M is the lay mounted on the lay-shaft $c$, and having the necessary motion imparted to it by any usual means. The lay is provided with two sets of shuttle-boxes, N N', the two shuttles being picked at the same time by one stick in the usual way.

In Figs. 3 and 4, $g$ represents the shuttle-race for the top shuttle. It is composed of a number of thin strips, $g'$, of steel, bent to the required form shown, and arranged side by side at intervals of three or four inches, and supported at their inner ends on a transverse bar or angle-iron, $h$, secured to the frame of the loom, and at their opposing ends entering between the cloth-plates $m$, where they remain loose, but are held in position by the yarn or threads, which pass from one fabric to the other. These strips $g'$ pass through or between the several gears or healds $i$, harness $k$, and the dents of the reed $l$, Fig. 4. The gears or healds $i$ are each provided with two eyes, one for the top chain, $n$, and one for the bottom chain, $o$.

The comber-board 5, through which the harness cords or wires $k$ pass, is connected by bars or rods $e\ e'$, Figs. 1 and 2, to the levers $d\ d'$, centered at $f$ to the frame of the loom, and raised by means of the cams X X' acting on the said levers $d\ d'$. The cams are fixed to the toothed wheels $y^5$, Fig. 2, mounted loosely upon the shaft $y^6$, on which shaft is keyed a pinion, $y^i$, in gear with a corresponding wheel, $z$, fast upon a counter-shaft, $y^2$. On the latter are keyed two wheels, $y^3$ and $y^4$, in gear with the wheels $y^5$, which carry the cams.

Figure 8:
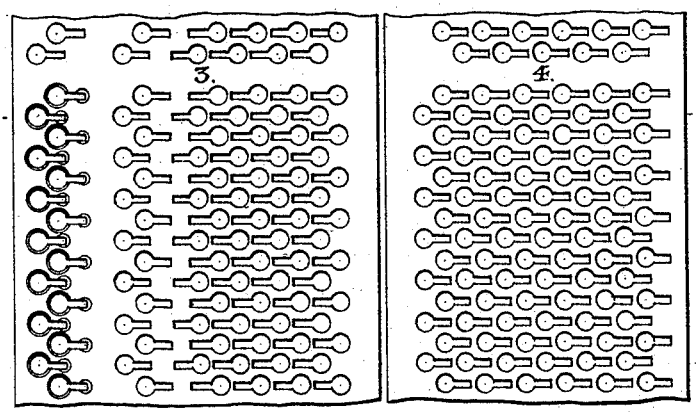

The boards 1 2 3 4, for operating and controlling the harness, are divided into corresponding pairs, one pair above the other. Of the upper pair the board 2 is fixed to the Jacquard frame, Figs. 1, 2, and 5, while the board 1 is carried by arms 13 on a cross-shaft, 14, which has an arm, 15, connected by a rod, 16, to the lever Z at the lower part of the loom. This lever Z is acted on by a cam, Y, Fig. 1, on the shaft $y^6$. Of the lower pair of boards, which are termed the "middle boards," the one, 4, which is below the upper movable board, 1, is fixed, while the board 3, which is below the upper fixed board, 2, is movable. This board 3 is carried by rods 7 8 on levers or arms 6, Figs. 1, 2, and 5, mounted on the cross-shaft 17, which has an arm, 18, Fig. 1, connected by a rod, 19, to a lever, Z'. This lever is acted upon by the cam Y' on the shaft $y^6$. The middle boards 3 and 4 are provided with holes and slots, through which the harness-cords pass, the slots in one board being arranged in the reverse direction from those in the other board, as shown in Figs. 7 and 8.

One-half of the harness-cords are secured to one of the upper boards, 1, and one-half to the other board, 2. The cords of the board 1 have only one set of knots over the board 4, and pass through the comber-board 5 without knots, so that when the needles 20, Fig. 1, of the jacquard push the cords required to form the pattern the knots of the cords acted on pass through the holes in the board 4, while those unacted on by the needles are caught in the slots. The Jacquard cylinder 21 and the needles may be operated by any well-known mechanism, which I have not illustrated, as it forms no part of my invention.

The harness-cords, which are suspended from the fixed board 2, have knots over the comber-board 5, as well as over the movable middle board, 3, Fig. 1. Thus the cords which are pushed by the Jacquard needles 20, Fig. 1, into the slots of the board 3, Fig. 8, so that the knots are caught as the board rises, are raised in the usual way to lift the warps from the bottom fabric to be bound in the top fabric. The said cords, having also knots immediately over the comber-board 5, are raised and lowered in the usual way for back and face shots.

The warp-yarns for forming the pattern or design are wound upon bobbins mounted in frames, as is usual in looms for weaving Brussels carpets or velvet pile, a separate frame being provided for each color. Each bobbin is governed, as usual, by a weight of its own, which always maintains the yarn taut, so that when the warps are raised or lowered by the jacquard to form the pattern they are afterward brought back or the slack taken up by the weight, when the jacquard makes its return motion. I provide a clamp, R, to hold the said warp-threads (while raised from the bottom fabric and lowered from the top fabric to form the pattern) until such threads are bound above and below by the weft-threads. By this means I prevent the weight on the bobbins from drawing the two fabrics together, and also insure a full open shed when the warps are at their highest and lowest positions, so that the upper and lower shuttles can be thrown simultaneously. This clamp, as shown in Figs. 1, 3, and 6, consists of sets of transverse bars $r$ and $t$, there being by preference three bars to a set—an upper bar, $t$, and two lower bars, $r$. The lower warps pass between the upper and lower bars of one set and the upper warps between the bars of the other set. In the construction shown the four lower bars, $r$, of the two sets are carried by a pair of upright levers, $q$, mounted on studs S on the frame. The upper bars, $t$, pass through the vertical slots $u$ in the levers $q$, and are carried by upright rods $x$, which are controlled by arm $w'$ $w^2$ on a cross-shaft, $w$, these arms $w'$ being acted on by the cam $v$ to raise or lower the upper clamping-bars. The cam $v$ is driven by the pinion $v'$, fixed on the shaft $y^6$ and gearing with the wheel $z$. The bars $t$ and one of the bars of each pair $r$ are covered with cloth to prevent slipping of the threads, which are to be clamped between them.

In Figs. 3 and 4 the clamp is shown in its closed position and the harness is shown in the position to have back shots thrown in both cloths.

The following description will explain more fully the operation of the loom and the production thereon of the fabrics, of which sectional diagrams are shown in Figs. 13 and 14.

The parts being in the positions shown in Fig. 1—that is, the top board in its highest position and the boards 3 and 5 in their lowest positions—the weft-shots 9 9, Fig. 13, are thrown in by the shuttles in the ordinary manner, and then the said boards 1, 3, and 5, being acted upon by cams Y Y' X, respectively, are caused to change their positions, the board 1 descending to its lowest position and the boards 3 and 5 being elevated. By these motions the harness-cords $k$, attached to the board 1 and carrying the warp-threads required to form the pattern, bring the said threads from their elevated position (shown in Fig. 1) to their lowest position, (shown in Figs. 3 and 4,) the knots on the said harness-cords passing through the holes in board 4, while the knots in the harness-cords carrying the warp-threads not required to form the pattern in the fabric engage the slots in the board 4, so that the said threads descend only to the center or in a line with the cloth-plates $m$ $m$, as shown in Figs. 3 and 4. In like manner, as the boards 3 and 5 rise, the knots in the harness-cords carrying the warp-threads not required to form the pattern in the fabric engage the slots in the comber-board 5, and are thereby raised to the center position only, while the yarn-threads required to form the pattern are raised by the board 3 to the required position, as shown in Figs. 3 and 4. The weft-shots 10 10 are now thrown in by the shuttles, after which the boards 1, 3, and 5 are returned to their former positions, (shown in Fig. 1,) and then the weft-shots 11 11 are thrown in by the shuttles. During the motions thus far described the positions of the heddles *i* have remained unaltered; but after the weft-shots 11 11 have all been thrown in the said heddles change their positions to those shown by the dotted lines in Fig. 3, thereby binding the chains or ground-warps *n n* round the shots of weft 9 9 10 10 11 11, as shown in Fig. 13, which have in the meantime been beaten up by the lay in the usual manner. The boards 1, 3, and 5 remain in the position shown in Fig. 1 until the shots of the weft 12 12 (which are repeats of the shots 9 9) are thrown in, after which the various motions hereinbefore described are repeated until the desired length of fabric is completed.

To produce the double fabric illustrated by Fig. 14, the cams $y$ $y'$ $x$, Figs. 10, 11, and 12, are substituted for those shown in Figs. 1 and 2, and filling or stuffing threads $n'$, Fig 14, worked by a separate set of heddles, are employed, but which are omitted from the drawings to prevent unnecessary complication. The boards 1, 3, and 5 being in the positions shown in Fig. 1, the shots 9 9, Fig. 14, are thrown in by the shuttles, after which the positions of the boards are changed by the cams $y$ $y'$ $x$, the board 1 being lowered and the boards 3 and 5 raised and the filling-threads $n$ $n'$ being in their highest and lowest positions. With the parts in the positions described the weft-shots 10 10 are thrown in by the shuttles, after which the board 1 is raised by the cam $y$ about halfway and the board 3 is lowered by the cam $y'$, causing the knots in the harness-cords which carry the warp-threads not required in the pattern to engage the slots in the comber-board 5, while at the same time the filling or stuffer threads $n'$ $n'$ are also brought to the center by the heddles which operate them. The weft-shots $10^\times$ $10^\times$ are then thrown in by the shuttles, after which the board 1 is raised to its highest position and the comber-board 5 lowered, and then the weft-shots 11 11 are thrown in. The heddles *i* then change their positions, causing the chains *n n* to bind the weft-threads 9 9 10 10 $10^\times$ $10^\times$ 11 11, after which the weft-shots 12 12 (which are repeats of the shots 9 9) are thrown in, and the various motions hereinbefore described are repeated until the required length of fabric is completed.

It will be understood that the clamp must not close before the warps for forming the figure have been raised and lowered from the bottom and top cloths, respectively, to their required points; but then the clamp is closed, and during the return movement of the harness the figure-threads have no power to draw the cloths together, since they are so held fast by the clamp that the weights on the said threads are prevented from drawing them back.

When the shots have been beaten up by the lay, the clamp is released, and if there be any surplus slackness in the pattern-threads it is immediately taken up by the weights on their bobbins. The threads by this time being returned to their original positions, the inside shots are thrown after two beats of the lay, the heddles *i* having changed after the first inside shot was thrown.

When weaving the fabric Fig. 13, the comber-board is raised only once for every three shots. When weaving the fabric Fig. 14, the comber-board is raised once for every four shots, and in place of the cams X cams *x*, Fig. 10, are employed, which will cause the comber-board to remain elevated while two shots are thrown.

Figs. 3 and 9 illustrate the mechanism for stopping the loom when the shuttles fail to enter their boxes. O O' are daggers or fingers, (one for each shuttle,) and P' is a notched piece fitted to slide on the block P, bolted to the frame of the loom.

If either of the shuttles fails in its throw, the upper end of the fingers O or O' (as the case may be) is left free to enter the box, so that its lower end will, as the lay moves forward, engage with a notch on the piece P', causing it to slide into contact with the lever $O^2$, secured to the shaft $O^5$, Figs. 3 and 9, which shaft is thereby turned in its bearings, so as to cause a lever, $O^3$, on the end thereof to move the starting and stopping lever $O^4$, to effect the stoppage of the loom.

The constructions of fabric herein set forth form the subject of an application for patent filed by me November 22, 1887, Serial No. 255,895.

I claim as my invention—

1. The combination of the lay and harness of a double-pile-fabric loom, operating mechanism for the harness, and devices for operating the ground-warps, with clamps to retain the pile warps at each operation of the harness to prevent their weights from drawing the cloths together, all substantially as described.

2. The combination of the harness, operating mechanism for the harness, and devices for operating the ground-warps, with the upper shuttle-race, a lay having two shuttles, and clamps to retain the pile-warp threads at each operation of the harness to prevent their weights from drawing the cloths together, all substantially as set forth.

3. The combination of the lay and harness of a double-pile-fabric loom, operating mechanism for the harness, and devices for operating the ground-warps, with upper and lower sets of clamping-bars to retain the pile-warp threads of the upper and lower fabrics at each movement of the harness to prevent the weights of the said warp-threads from drawing the cloths together, and devices, substantially as described, for operating the clamping-bars, all substantially as set forth.

In testimony whereof I have signed my name to this specification in the presence of two subscribing witnesses.

WILLIAM HENRY BAIRSTOW.

Witnesses:
    EDWD. GEO. DAVIES,
    CHAS. JAS. JONES,
*Both of 47 Lincoln's Inn Fields, London, W. C.*